US008431653B2

(12) United States Patent
Ogawa et al.

(10) Patent No.: US 8,431,653 B2
(45) Date of Patent: Apr. 30, 2013

(54) CURING AGENT COMPOSITION FOR EPOXY RESINS AND EPOXY RESIN COMPOSITION

(75) Inventors: Shun Ogawa, Hiratsuka (JP); Hisayuki Kuwahara, Hiratsuka (JP)

(73) Assignee: Mitsubishi Electric Company, Inc., Tokyo (JP)

( * ) Notice: Subject to any disclaimer, the term of this patent is extended or adjusted under 35 U.S.C. 154(b) by 1562 days.

(21) Appl. No.: 11/637,117

(22) Filed: Dec. 12, 2006

(65) Prior Publication Data

US 2007/0142572 A1 Jun. 21, 2007

(30) Foreign Application Priority Data

Dec. 16, 2005 (JP) ................................ 2005-363475

(51) Int. Cl.
*C08F 283/00* (2006.01)
(52) U.S. Cl.
USPC .......................................................... 525/476
(58) Field of Classification Search ................... 525/476
See application file for complete search history.

(56) References Cited

U.S. PATENT DOCUMENTS

| | | | | | |
|---|---|---|---|---|---|
| 4,348,505 | A | * | 9/1982 | Di Benedetto et al. | 525/504 |
| 5,395,697 | A | * | 3/1995 | Morrison | 428/412 |
| 5,565,516 | A | * | 10/1996 | Fausnight et al. | 524/556 |
| 5,859,181 | A | | 1/1999 | Zhao et al. | |
| 5,981,629 | A | * | 11/1999 | Cork | 523/442 |
| 7,598,325 | B2 | * | 10/2009 | Ogawa et al. | 525/526 |
| 8,337,965 | B2 | * | 12/2012 | Itano et al. | 428/1.53 |
| 2006/0205861 | A1 | * | 9/2006 | Gordon et al. | 524/506 |
| 2007/0049708 | A1 | * | 3/2007 | Kutsuna et al. | 525/529 |
| 2009/0239069 | A1 | * | 9/2009 | Yonehama et al. | 428/354 |
| 2010/0286345 | A1 | * | 11/2010 | Sato et al. | 525/523 |
| 2011/0054061 | A1 | * | 3/2011 | Itano et al. | 522/64 |
| 2011/0086220 | A1 | * | 4/2011 | Yoshida et al. | 428/317.5 |
| 2012/0003500 | A1 | * | 1/2012 | Yoshida et al. | 428/688 |
| 2012/0128532 | A1 | * | 5/2012 | Kashiba et al. | 422/40 |
| 2013/0028540 | A1 | * | 1/2013 | Matsumoto et al. | 383/107 |

FOREIGN PATENT DOCUMENTS

| | | |
|---|---|---|
| EP | 1 452 554 | 9/2004 |
| JP | 3-239719 | 10/1991 |
| JP | 11-269252 | 10/1999 |
| WO | 99/45053 | 9/1999 |
| WO | WO 2005010115 | * 2/2005 |

OTHER PUBLICATIONS

"Product Information Dow Corning 190 Fluid." May 17, 2002.*
Database WPI Week 199149, Derwent Publications Ltd., London, GB; AN 1991-357899, XP002425359 & JP 03 239719 A (Sumitomo Rubber Ind Ltd) Oct. 25, 1991 *abstract*.

* cited by examiner

*Primary Examiner* — Mark Eashoo
*Assistant Examiner* — Megan McCulley
(74) *Attorney, Agent, or Firm* — Wenderoth, Lind & Ponack L.L.P.

(57) ABSTRACT

The present invention relates to a curing agent composition for epoxy resins comprising (A) a polyamine compound which is a reaction product of a compound having at least one glycidyl group in a molecule with a diamine having a specific structure, (B) a polyether-modified polysiloxane having a surface tension in the range of 19 dyne/cm to 25 dyne/cm and (C) an amino group-modified polysiloxane having a total amine value in the range of 150 mgKOH/g to 650 mgKOH/g which can provide excellent curing performances, excellent performances of epoxy resin cured coating films and excellent physical properties of epoxy resin cured products, an epoxy resin composition comprising said curing agent composition for epoxy resins and an epoxy resin cured product obtained by curing said epoxy resin composition.

15 Claims, No Drawings

CURING AGENT COMPOSITION FOR EPOXY RESINS AND EPOXY RESIN COMPOSITION

BACKGROUND OF THE INVENTION

1) Field of the Invention

The present invention relates to a curing agent for epoxy resins comprising a polyamine compound having a specific structure as a curing agent for epoxy resins, a polyether-modified polysiloxane and an amino group-modified polysiloxane, an epoxy resin composition comprising said curing agent composition for epoxy resins and an epoxy resin cured product obtained by curing said epoxy resin composition.

2) Related Art

It has been well known that various polyamine compounds are widely used as a curing agent for epoxy resins and a raw material thereof. The epoxy resin compositions using these curing agents for epoxy resins are particularly utilized widely in a field of coating materials such as a corrosion-resistant paint for ships, bridges and land and marine iron structures and a field of civil engineering and construction such as materials for lining, reinforcement or repair of concrete structures, flooring materials of buildings, linings of water supply and sewerage systems, pavement materials, and adhesive materials.

Among these polyamine compounds, a diamine represented by the following formula (I) and a curing agent for epoxy resins using said diamine as a raw material have features such that they can provide an epoxy resin composition having excellent curing performances, they can provide an epoxy resin cured coating film having excellent film performances and they can provide an epoxy resin cured product having excellent physical properties compared to other polyamine compounds and a curing agent for epoxy resins using said other polyamine compounds as a raw material.

$$H_2N-H_2C-A-CH_2-NH_2 \qquad (1)$$

wherein A is a phenylene group or a cyclohexylene group

On the other hand, however, an epoxy resin composition using a diamine represented by the formula (I) or a curing agent for epoxy resins using said diamine as a raw material easily produces carbamate or carbonate by absorbing carbon dioxide or water vapor in the atmosphere. Generation of carbamate or carbonate is unfavorable because there is a tendency that deterioration of performances of an epoxy resin cured coating film such as gloss, clarity or leveling, deterioration of drying performance, i.e. becoming difficult to dry, deterioration of physical properties of an epoxy resin cured product such as intensity, deterioration of adhesiveness to a substrate whereon the cured coating film is formed will occur. In addition, appearance of a coating film will become inferior because whitening may easily occur by deterioration of water resistance.

Various additives are used for the purpose of improving surface properties such as a surface appearance, drying performance and water resistance of an epoxy resin cured coating film and an epoxy resin cured product. However, the following problems may often occur though using additives: improvement of water resistance of an epoxy resin cured coating film is not satisfactory though the drying performance is improved, improvement of drying performance of an epoxy resin cured coating film and an epoxy resin cured product is not satisfactory though water resistance is improved, and clarity of an epoxy resin cured coating film is deteriorated though drying performance and water resistance are improved. In addition, deterioration of adhesiveness to a substrate may occur by using additives.

It is well known to use an addition reaction product of a diamine represented by the formula (I) and epoxy resins, i.e. an epoxy adduct, as a curing agent for epoxy resins (see Japanese Patent Publication No. 03-239719, Japanese Patent Publication No. 11-269252). However, satisfactory properties of cured products in terms of the appearance of coating films such as gloss, clarity and leveling, water resistance and the like can not be achieved only by using such an epoxy adduct.

SUMMARY OF THE INVENTION

An object of the present invention is to provide a curing agent composition for epoxy resins comprising a polyamine compound as a curing agent for epoxy resins which can provide excellent curing performances, excellent performances of epoxy resin cured coating films and excellent properties of epoxy resin cured products, an epoxy resin composition comprising said curing agent composition for epoxy resins, and an epoxy resin cured product obtained by curing said epoxy resin composition.

As a result of extensive studies, the inventors have found that an epoxy resin composition comprising a combination of an epoxy resin curing agent consisting of a polyamine compound having a specific structure, polyether-modified polysiloxane having a specific feature and an amino group-modified polysiloxane having a specific feature has an excellent surface appearance such as clarity, an excellent drying performance i.e. being easy to dry, an excellent adhesiveness to a substrate and an excellent water resistance.

Therefore, the present invention provides a curing agent composition for epoxy resins, an epoxy resin composition and an epoxy resin cured product obtained by curing said epoxy resin composition described as follows:

1) A curing agent composition for epoxy resins comprising the following components (A), (B) and (C):

(A) a polyamine compound which is a reaction product of a compound having at least one glycidyl group in a molecule with a diamine represented by the formula (I):

$$H_2N-H_2C-A-CH_2-NH_2 \qquad (1)$$

wherein A is a phenylene group or a cyclohexylene group (B) a polyether-modified polysiloxane having a surface tension in the range of 19.0 dyne/cm to 25.0 dyne/cm (C) an amino group-modified polysiloxane having a total amine value in the range of 150 mgKOH/g to 650 mgKOH/g.

2) The curing agent composition for epoxy resins according to 1), wherein said polyether-modified polysiloxane (B) has a surface tension in the range of 22.5 dyne/cm to 24.0 dyne/cm.

3) The curing agent composition for epoxy resins according to 1) or 2), wherein said amino group-modified polysiloxane (C) has a total amine value in the range of 300 mgKOH/g to 550 mgKOH/g.

4) The curing agent composition for epoxy resins according to 1) to 3), Wherein the content of said polyether-modified polysiloxane (B) is in the range of 0.025 to 4.0% by weight based upon the total amount of said components (A), (B) and (C).

5) The curing agent composition for epoxy resins according to 1) to 4), the content of said amino group-modified polysiloxane (C) is in the range of 0.05 to 4.0% by weight based upon the total amount of said components (A), (B) and (C).

6) An epoxy resin composition comprising at least the following components (A), (B) and (C):
   (A) a polyamine compound which is a reaction product of a compound having at least one glycidyl group in a molecule with a diamine represented by the formula (I):

$$H_2N-H_2C-A-CH_2-NH_2 \quad (1)$$

wherein A is a phenylene group or a cyclohexylene group
   (B) a polyether-modified polysiloxane having a surface tension in the range of 19.0 dyne/cm to 25.0 dyne/cm
   (C) an amino group-modified polysiloxane having a total amine value in the range of 150 mgKOH/g to 650 mgKOH/g.
7) The epoxy resin composition according to 6), wherein the content of said polyamine compound (A) is in the range of 0.7 to 1.2 in terms of a proportion of the number of active hydrogen atoms of said polyamine compound (A) to the number of epoxy groups of the epoxy resin.
8) The epoxy resin composition according to 6) or 7), wherein the content of said polyether-modified polysiloxane (B) is in the range of 0.005 to 1.5% by weight based upon the total amount of said epoxy resin composition.
9) The epoxy resin composition according to 6) to 8), wherein the content of said amino group-modified polysiloxane (C) is in the range of 0.01 to 1.5% by weight based upon the total amount of said epoxy resin composition.
10) An epoxy resin cured product obtained by curing the epoxy resin composition according to 6) to 9).

The curing agent composition for epoxy resins of the present invention can provide an epoxy resin composition with excellent curing performances such as quick-drying performance, excellent performance of epoxy resin cured coating films such as gloss, clarity, leveling and water resistance, and excellent physical properties of epoxy resin cured products such as intensity and elasticity by combining a polyamine compound having a specific structure, a polyether-modified polysiloxane having a surface tension in the specific range and an amino group-modified polysiloxane having a total amine value in the specific range.

It has not been known to use the above-mentioned specific combination of a polyamine compound, a polyether-modified polysiloxane and an amino group-modified polysiloxane by adding in an epoxy resin.

DETAILED DESCRIPTION OF THE INVENTION

1. Curing Agent Composition for Epoxy Resins:

The curing agent composition for epoxy resins of the present invention comprises the above-mentioned components (A), (B) and (C).

(1) Component (A)

The component (A) which is a polyamine compound comprised in the curing agent composition for epoxy resins of the present invention as a curing agent for epoxy resins is a reaction product of a glycidyl compound with a diamine represented by the following formula (I):

$$H_2N-H_2C-A-CH_2-NH_2 \quad (1)$$

wherein A is a phenylene group or a cyclohexylene group

Suitable diamines represented by the above formula (I) include orthoxylylenediamine, metaxylylenediamine, paraxylylenediamine, 1,2-bis(aminomethyl)cyclohexane, 1,3-bis(aminomethyl)cyclohexane and 1,4-bis(aminomethyl)cyclohexane. Among them, metaxylylenediamine and 1,3-bis(aminomethyl)cyclohexane are more preferable. 1,3-bis(aminomethyl)cyclohexane is most preferable.

The glycidyl compound used in the present invention is a compound having at least one glycidyl group in a molecule. Suitable glycidyl compounds include butyl glycidylether, phenyl glycidylether, metacresyl glycidylether, paracresyl glycidylether, orthocresyl glycidylether, neodecanoic acid glycidylester, 4,4'-isopropylidenediphenol diglycidylether (a bisphenol A-type epoxy resin), 4,4'-methylenediphenol diglycidylether (a bisphenol F-type epoxy resin), neopentylglycol diglycidylether, 1,2-propanediol diglycidylether, 1,4-butanediol diglycidylether and 1,6-hexanediol diglycidylether. Among them, a bisphenol A-type epoxy resin and a bisphenol F-type epoxy resin are preferable.

These glycidyl compounds may be same as or different from the epoxy resin used as a base resin in the epoxy resin composition of the present invention.

In the case of reaction between a diamine and a glycidyl compound, the amino groups of the diamine react with glycidyl groups of the glycidyl compound. This kind of reaction can be described as addition reaction wherein the amino group of the diamine is added with the glycidyl group of the glycidyl compound. Accordingly, the polyamine compound (A) of the present invention which is a reaction product of a diamine and a glycidyl compound can be described as an addition reaction product, i.e. an epoxy adduct, obtained by adding a glycidyl compound with a diamine.

Examples of the reaction products of the diamine and the glycidyl compound of the present invention include compounds having the following structures (a) to (d), though the usable reaction products should not be limited to them.

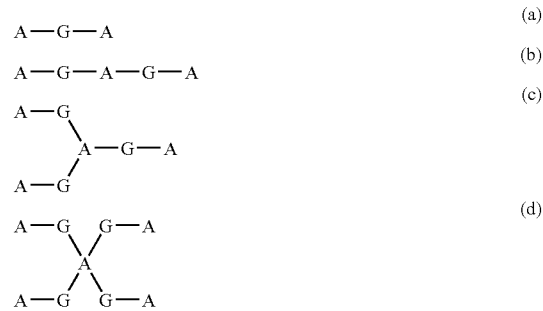

In the above structures (a) to (d), "A" represents a diamine residue and "G" represents a glycidyl compound residue.

The polyamine compound (A) of the present invention is a mixture of the reaction products having various structures represented by the above-described structures (a) to (d). In addition, unreacted diamine can be comprised in the polyamine compound (A).

As a method for reacting the diamine and the glycidyl compound, well-known methods can be employed. Examples include a method of firstly feeding diamine into a reactor, then adding a glycidyl compound dropwise therein and starting the reaction by heating.

Though the proportion of the diamine and the glycidyl compound used in the reaction can not be limited, it is preferable to use excess amount of diamine to the epoxy equivalent of the glycidyl compound, because the reaction product thus obtained should be a polyamine compound having at least two amino groups at the ends in order to act as a curing agent for epoxy resins.

To be more precise, it is preferable to use the diamine and the glycidyl compound so as to satisfy the formula [D]/[G]=20–4, more preferably [D]/[G]=16–8, wherein [D] represents the number of active hydrogen atoms of the diamine and [G] represents the number of epoxy groups of the glycidyl compound.

When the proportion of the glycidyl compound is too much, viscosity of the curing agent for epoxy resin may become extremely high to impair workability. When the proportion of diamine is too much, the rate of unreacted diamine in the reaction product obtained will become high and as a result, gloss, clarity, leveling and water resistance of epoxy resin cured coating films may be deteriorated.

(2) Component (B)

The polyether-modified polysiloxane used as the component (B) in the composition of the present invention can be synthesized by introducing polyether chains to polysiloxane (silicone). The polyether chains can, for example, be introduced by reacting polysiloxane with polyether in a solvent.

Suitable polysiloxanes include polydimethylsiloxane. Suitable polyethers include polyethylene oxide and polypropylene oxide. These compounds can be used independently or in combination with each other.

The solvent used for synthesizing the polyether-modified polysiloxane should not be particularly limited. Suitable solvents include aromatic solvents such as toluene and xylene, alcoholic solvents such as methanol, ethanol, n-propanol, isopropanol, n-butanol and isobutanol and glycol ether solvents such as 2-methoxy ethanol, 2-ethoxy ethanol, 2-propoxy ethanol, 2-butoxy ethanol, 1-methoxy-2-propanol, 1-ethoxy-2-propanol and 1-propoxy-2-propanol.

The component (B) of the present invention can be used as a simple substance obtained by isolating polyether-modified polysiloxane from the reaction mixture of synthesis or the reaction mixture of synthesis can be used directly as the component (B).

The component (B) of the present invention, as a simple substance, has its surface tension measured by Wilhelmy method (JIS K2241) under the conditions of 23° C. and 50% RH is in the range of 19.0 dyne/cm to 25.0 dyne/cm, more preferably in the range of 22.5 dyne/cm to 24.0 dyne/cm.

The polyether-modified polysiloxane (B) having surface tension of 19.0 dyne/cm to 25.0 dyne/cm is commercially available. Examples of polyether-modified polydimethylsiloxanes include "BYK-302", "BYK-331", "BYK-345", "BYK-347" and "BYK-348" each trade names, manufactured by BYK-Chemie Japan KK, wherein polyethylene oxide and polypropylene oxide are used as polyether.

The polyether-modified polysiloxane (B) with the surface tension of lower than 19.0 dyne/cm is not preferable because compatibility with the polyamine compound (A) may be poor and clarity of epoxy resin cured coating films and epoxy resin cured products may be deteriorated. The polyether-modified polysiloxane (B) with the surface tension of higher than 25.0 dyne/cm is not preferable because the effect of improvement regarding the performance of epoxy resin cured coating films may be insufficient, and additionally, water resistance may be deteriorated.

The content of polyether-modified polysiloxane (B) in the curing agent composition for epoxy resins of the present invention is preferably 0.025 to 4.0% by weight, more preferably 0.1 to 2.0% by weight based upon the total amount of the components (A), (B) and (C).

When the content of polyether-modified polysiloxane (B) is less than 0.025% by weight, the effect of improvement of leveling may be insufficient. When the content of polyether-modified polysiloxane (B) is more than 4.0% by weight, the adhesiveness to the substrate may be deteriorated.

(3) Component (C)

The amino group-modified polysiloxane used as the component (C) in the composition of the present invention is a polysiloxane introduced with amino groups. It can, for example, be synthesized by introducing primary and/or secondary amino groups to polysiloxane (silicone) in a solvent.

The solvent used for synthesizing the amino group-modified polysiloxane should not be particularly limited. Suitable solvents include aromatic solvents such as toluene and xylene, alcohol solvents such as methanol, ethanol, n-propanol, isopropanol, n-butanol and isobutanol and glycol ether solvents such as 2-methoxy ethanol, 2-ethoxy ethanol, 2-propoxy ethanol, 2-butoxy ethanol, 1-methoxy-2-propanol, 1-ethoxy-2-propanol and 1-propoxy-2-propanol.

The component (C) of the present invention can be used as a simple substance obtained by isolating amino group-modified polysiloxane from the reaction mixture of synthesis or the reaction mixture of synthesis can be used directly as the component (C).

The total amine value of a simple substance of the amino group-modified polysiloxane (C) measured by potentiometric titration is preferably in the range of 150 mgKOH/g to 650 mgKOH/g, more preferably in the range of 300 mgKOH/g to 550 mgKOH/g.

The amino group-modified polysiloxane having such a specific range of the total amine value is commercially available. Examples of amino group-modified silicone include "KP-390", "KC-224B" (each brand name, manufactured by Shin-Etsu Chemical Co., Ltd.)

The amino group-modified polysiloxane with the total amine value of less than 150 mgKOH/g is not preferable because compatibility with the polyamine compound (A) may be poor and clarity and leveling of epoxy resin cured coating films and epoxy resin cured products may be deteriorated. The amino group-modified polysiloxane with the total amine value of higher than 650 mgKOH/g is not preferable because the effect of improvement regarding water resistance may be insufficient.

The content of amino group-modified polysiloxane (C) in the curing agent composition for epoxy resins of the present invention is preferably 0.05 to 4.0% by weight, more preferably 0.5 to 3.0% by weight based upon the total amount of the components (A), (B) and (C).

When the content of amino group-modified polysiloxane (C) is less than 0.05% by weight, the effect of improvement of water resistance may be insufficient. When the content of amino group-modified polysiloxane (C) is more than 4.0% by weight, the adhesiveness to the substrate may be deteriorated.

(4) Other components

The curing agent composition for epoxy resins of the present invention may be consisting essentially of the above-mentioned polyamino compound (A), the polyether-modified polysiloxane (B) and the amino group-modified polysiloxane (C) or may be containing other components. In particular, well-known polyamino compounds used as an ordinary curing agent can be comprised in the composition of the present invention as a curing agent for epoxy resins other than the polyamino compound (A).

Representative examples of the other polyamino compounds are as follows: aliphatic polyamines such as ethylenediamine, diethylenetriamine, triethylenetetramine, tetraethylenepentamine, pentaethylenehexamine and hexamethylenediamine; aliphatic polyamines having aromatic rings such as xylylenediamine; alicyclic polyamines such as menthanediamine, isophoronediamine, bis(aminomethyl)cyclohexane and N-aminomethylpiperazine; aromatic polyamines such as phenylenediamine, diaminodiphenylmethane and diaminodiphenylsulfone; polyamino compounds having a polyether structure; and polyamino compounds having a norbornane structure.

These polyamino compounds can be blended without modification, or be blended after modification such as amide-modification by reacting with a compound having carboxyl groups or Mannich modification by reacting with formaldehyde and phenol.

In this case, the content of other polyamino compounds should not be limited as long as the effect of the polyamino compound (A) used as a main curing agent in the present invention is not diminished. The preferable content of other polyamino compounds is not more than 100 parts by weight based upon 100 parts by weight of the component (A).

In addition, the curing agent composition of the present invention can contain other components such as diluents and curing accelerators according to the intended purpose.

2. Epoxy Resin Composition

The epoxy resin composition of the present invention comprises the above-mentioned curing agent composition for epoxy resins. That is, the epoxy resin composition of the present invention is characterized in that at least the above-mentioned polyamino compound (A) as a curing agent for epoxy resins, the above-mentioned polyether-modified polysiloxane (B) and the above-mentioned amino group-modified polysiloxane (C) are comprised in.

The content of the polyamine compound (A) is preferably in the range of 0.7 to 1.2, more preferably 0.8 to 1.1 in terms of a proportion of the number of active hydrogen atoms of said polyamine compound (A) to the number of epoxy groups of the epoxy resin (="the number of active hydrogen atoms"/ "the number of epoxy groups").

When the content of the polyamino compound (A) is too little, the degree of cross-linkage of a cured product may be insufficient. When the content of the polyamino compound (A) is too much, water resistance of the epoxy resin composition may be deteriorated.

The content of the polyether-modified polysiloxane (B) is preferably in the range of 0.005 to 1.5% by weight, more preferably in the range of 0.02 to 1.0% by weight based upon the total amount of said epoxy resin composition.

When the content of the polyether-modified polysiloxane (B) is too little, the effect of improvement of leveling such as appearance may be insufficient. When the content of the polyether-modified polysiloxane (B) is too much, adhesiveness to a substrate may be deteriorated.

The content of the amino group-modified polysiloxane (C) is preferably in the range of 0.01 to 1.5% by weight, more preferably in the range of 0.1 to 1.0% by weight based upon the total amount of said epoxy resin composition.

When the content of the amino group-modified polysiloxane (C) is too little, the effect of improvement of water resistance may be insufficient. When the content of the amino group-modified polysiloxane (C) is too much, adhesiveness to a substrate may be deteriorated.

The method for blending the polyamino compound (A), the polyether-modified polysiloxane (B) and the amino group-modified polysiloxane (C) with an epoxy resin is not limited. Examples of the methods for blending include a method of firstly obtaining a mixture of the polyamino compound (A), the polyether-modified polysiloxane (B) and the amino group-modified polysiloxane (C) in advance and then adding the mixture into an epoxy resin and a method of adding the polyamino compound (A), the polyether-modified polysiloxane (B) and the amino group-modified polysiloxane (C) each independently into an epoxy resin. Addition of the components into the epoxy resin may also be conducted when using, i.e. coating or curing, the epoxy resin composition.

Well-known devices can be used as a blending device to blend additives comprising the components (A) (B) and (C) into an epoxy resin. Examples of the devices include a dissolver, a high-speed mixer, a homomixer, a kneader and a roll-mill.

The epoxy resin composition of the present invention comprises an epoxy resin as a base resin and a curing agent for epoxy resins. The epoxy resin used in the present invention should not be limited as long as it has glycidyl groups reactive with active hydrogen atoms derived from amino groups containing in the curing agent for epoxy resins of the present invention.

Examples of epoxy resins include a multifunctional epoxy resin and a monofunctional epoxy resin.

Examples of multifunctional epoxy resins include diglycidylether compounds of mononuclear divalent phenols such as resorcinol and hydroquinone; diglycidylether compounds of multinuclear divalent phenols such as 4,4'-isopropylidene diphenol (bisphenol A) and 4,4'-methylene diphenol (bisphenol F); diglycidylether compounds of diols such as ethyleneglycol, propyleneglycol, butanediol and hexanediol; diglycidylester compounds of aliphatic, aromatic or alicyclic dibasic acids such as maleic acid, fumaric acid, itaconic acid, succinic acid, glutaric acid, suberic acid, adipic acid, azelaic acid, sebacic acid, phthalic acid, isophthalic acid, terephthalic acid and cyclohexane dicarboxylic acid; glycidyl amine compounds such as 1,3-bis(N,N-diglycidyl aminomethyl) benzene and 1,3-bis(N,N-diglycidyl aminomethyl)cyclohexane.

Examples of monofunctional epoxy resins include glycidylether compounds with alcohol such as butyl alcohol or higher alcohols; glycidylether compounds with mononuclear monovalent phenol compounds such as phenol, metacresol, paracresol and orthocresol; and glycidylester compounds with monovalent carboxylic acids such as neodecanoic acid.

Among them, it is preferable to use 4,4'-isopropylidene diphenol diglycidylether (a bisphenol A-type epoxy resin), 4,4'-methylene diphenol diglycidylether (a bisphenol F-type epoxy resin) or the mixture thereof as a main component of the epoxy resin.

In addition, in the case of using a bisphenol A-type epoxy resin and/or a bisphenol F-type epoxy resin as a main component of the epoxy resin, it is possible to use a small amount of other epoxy resins having glycidyl groups than the bisphenol A-type epoxy resin and the bisphenol F-type epoxy resin such as diglycidyl ether compounds of diols and monofunctional diglycidyl compounds as a reactive diluent.

Further, components for modification such as filler and plasticizer, components for adjusting fluidity such as a non-reactive diluent and a thixotropic agent, ingredients such as a pigment and a tackifier, additives such as an anti-cissing agent, a leveling agent, an antifoaming agent, an ultraviolet absorber, a light stabilizer and a curing accelerator can be added to the epoxy resin composition of the present invention according to the intended use, insofar as the effect of the present invention is not impaired.

The non-reactive diluents usable in the present invention should not be limited. Examples of the non-reacted diluents include plasticizers such as dibutyl phthalate and dioctyl phthalate, liquid resins such as a xylene resin and a toluene resin, alcohols such as benzyl alcohol and butyldiglycol. These diluents can be used insofar as the effect of the present invention is not impaired.

The curing accelerators usable in the present invention should not be limited. Examples of the curing accelerators include phenols such as phenol, alkyl phenol, bisphenol A and 2,4,6-tris(dimethylamino)phenol; alcohols such as benzyl alcohol; organic acids such as salicylic acid and benzoic acid; and phosphorus compounds such as triphenyl phosphite and triphenyl phosphine. These curing accelerators can be used insofar as the effect of the present invention is not impaired.

The epoxy resin composition of the present invention can be cured by well known methods to produce an epoxy resin cured product. The curing conditions can be appropriately selected according to the intended purpose insofar as the effect of the present invention is not impaired.

Preferred Embodiment of the Invention

The present invention will be described in more detail below referring to Examples, which are not intended to limit the scope of the present invention. Various evaluations were carried out by the following methods.

[Evaluation of Properties of Epoxy Resin Cured Coating Films]

An epoxy resin composition was coated on a cold rolled steel plate (SPCC-SB), treated with #240 sand paper and defatted with xylene in accordance with JIS-G-3141, with thickness of 200 µm under the conditions of 23° C. and 50% RH.

a) Appearance:

The appearance of a coating film aged for 7 days after coating and curing was evaluated visually (gloss, clarity, leveling). Drying performance of coating films aged for 16 hours, 1 day, 4 days and 7 days after curing was evaluated by touching with finger, based on the following 4 stages of criteria:

◎; Excellent, ○; good Δ; fair X; poor.

b) Water Resistance:

Water droplets were dropped on coating films aged for 16 hours, 1 day, 4 days and 7 days after curing. Change of the appearance of the coating films passed 1 day after dropping was evaluated visually based on the following 4 stages of criteria:

◎; Excellent, ○; good Δ; fair X; poor.

b) Adhesiveness to a substrate:

Cutting of 25 checkerboard patterns was performed with 2 mm spacing on a coating film aged for 7 days after coating. An adhesive tape was sticked on the checkerboard patterns, and then evaluation was carried out by calculating the number of remaining grids after peeling the tape off. Operation of sticking and peeling was conducted twice.

[Surface Tension]

Surface tension was measured in accordance with Wilhelmy method (JIS-K-2241) using automatic surface tensiometer "CBVP-A3" manufactured by Kyowa Interface Science Co., Ltd., under the condition of 23° C. and 50% RH.

Total amine value was measured in accordance with potentiometric titration using a potentiometric titrator "AT-410" manufactured by Kyoto Electronics Manufacturing Co., Ltd. Titrant; 0.1N perchloric acid acetic acid solution Solvent; acetic acid Example of Synthesis 1

1066.8 g (7.5 mol) of 1,3-bis(aminomethyl)cyclohexane, manufactured by Mitsubishi Gas Chemical Co., Inc., in Japan (hereinafter, "1,3-BAC") was charged to a separable flask with internal volume of 2 L (liter) equipped with an agitator, a thermometer, a nitrogen gas inlet, a dropping funnel and a condenser.

Then, its temperature was raised to 80° C. in a nitrogen gas stream with stirring. Maintaining the temperature at 80° C., 558 g of a Bisphenol A-type epoxy resin with an epoxy equivalent of 186 g/eq, manufactured by Japan Epoxy Resins Co., Ltd., trade name; "Epicoat 828" (hereinafter, "DGEBA"), was added thereto dropwise over 2 hours. After the completion of dropwise addition, its temperature was raised to 100° C. to conduct reaction for 2 hour. Thus, 1615.5 g of an adduct of DGEBA with 1,3-BAC (herein after, "polyamino compound A") was obtained.

Example of Synthesis 2

1022 g of isophoronediamine, manufactured by Huels Japan Ltd. (hereinafter, "IPDA"), was charged to a flask similar as the one used in Example of Synthesis 1. Then, its temperature was raised to 80° C. in a nitrogen gas stream with stirring. Maintaining the temperature at 80° C., 279.2 g of a Bisphenol A-type epoxy resin with an epoxy equivalent of 186 g/eq, manufactured by Japan Epoxy Resins Co., Ltd., trade name; "Epicoat 828" (hereinafter, "DGEBA"), was added thereto dropwise over 2 hours. After the completion of dropwise addition, its temperature was raised to 100° C. to conduct reaction for 2 hour. Thus, 1296.9 g of an adduct of DGEBA with IPDA (herein after, "polyamino compound B") was obtained.

Example 1

82.2 g of polyamino compound A obtained by Example of Synthesis 1 was weighed and charged to a glass mayonnaise bottle (a thick-walled wide-mouthed bottle) with the volume of 145 ml. 9.1 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 2.0 g of 50% n-butanol solution of amino group-modified silicone (1.0 g as a simple substance) with total amine value of 509 mgKOH/g, manufactured by Shin-Etsu Chemical Co., Ltd., trade name; "KP-390", and 5 g of triphenylphosphite as a curing accelerator were added thereto and stirred for 2 minutes at a temperature of 60° C., whereby 100 g of curing agent composition for epoxy resins A was obtained.

The curing agent composition for epoxy resins A thus obtained was mixed with DGEBA at a ratio shown in Table 1 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 1.

Example 2

82.2 g of polyamino compound A obtained by Example of Synthesis 1 was weighed and charged to a glass mayonnaise bottle with the volume of 145 ml. 9.1 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 2.0 g of 50% toluene solution of amino group-modified silicone (1.0 g as a simple substance) with total amine value of 376 mgKOH/g, manufactured by Shin-Etsu Chemical Co., Ltd., trade name; "KC-224B", and 5 g of triphenylphosphite as a curing accelerator were added thereto and stirred for 2 minutes at a temperature of 60° C., whereby 100 g of curing agent composition for epoxy resins B was obtained.

The curing agent composition for epoxy resins B thus obtained was mixed with DGEBA at a ratio shown in Table 1 to obtain an epoxy resin composition. The epoxy resin composition thus obtained was cured under the conditions of 23° C. and 50% RH to prepare an epoxy resin cured coating film.

The property of the epoxy resin cured coating film was evaluated and the result was shown in Table 1.

Comparative Example 1

82.3 g of polyamino compound A obtained by Example of Synthesis 1 was weighed and charged to a glass mayonnaise bottle with the volume of 145 ml. 9.2 g of benzyl alcohol as a diluent, 1.5 g of polyether-modified polydimethylsiloxane as a simple substance with surface tension of 18.5 dyne/cm, manufactured by BYK-Chemie Japan KK, trade name; "BYK-307", 2.0 g of 50% n-butanol solution of amino group-modified silicone (1.0 g as a simple substance) with total amine value of 509 mgKOH/g, manufactured by Shin-Etsu Chemical Co., Ltd., trade name; "KP-390", and 5 g of triphenylphosphite as a curing accelerator were added thereto and stirred for 2 minutes at a temperature of 60° C., whereby 100 g of curing agent composition for epoxy resins C was obtained.

The curing agent composition for epoxy resins C thus obtained was mixed with DGEBA at a ratio shown in Table 2 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 2.

Comparative Example 2

82.3 g of polyamino compound A obtained by Example of Synthesis 1 was weighed and charged to a glass mayonnaise bottle with the volume of 145 ml. 9.2 g of benzyl alcohol as a diluent, 1.5 g of polyether-modified polydimethylsiloxane as a simple substance with surface tension of 18.5 dyne/cm, manufactured by BYK-Chemie Japan KK, trade name; "BYK-307", 2.0 g of 50% toluene solution of amino group-modified silicone (1.0 g as a simple substance) with total amine value of 376 mgKOH/g, manufactured by Shin-Etsu Chemical Co., Ltd., trade name; "KC-224B", and 5 g of triphenylphosphite as a curing accelerator were added thereto and stirred for 2 minutes at a temperature of 60° C., whereby 100 g of curing agent composition for epoxy resins D was obtained.

The curing agent composition for epoxy resins D thus obtained was mixed with DGEBA at a ratio shown in Table 2 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 2.

Comparative Example 3

81.3 g of polyamino compound A obtained by Example of Synthesis 1 was weighed and charged to a glass mayonnaise bottle with the volume of 145 ml. 9.0 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 3.0 g of 8% ethanol solution of amino group-modified silicone (0.24 g as a simple substance) with total amine value of 660 mgKOH/g, manufactured by Shin-Etsu Chemical Co., Ltd., trade name; "KC-223", and 5 g of triphenylphosphite as a curing accelerator were added thereto and stirred for 2 minutes at a temperature of 60° C., whereby 10 g of curing agent composition for epoxy resins E was obtained.

The curing agent composition for epoxy resins E thus obtained was mixed with DGEBA at a ratio shown in Table 2 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 2.

Comparative Example 4

83.1 g of polyamino compound A obtained by Example of Synthesis 1 was weighed and charged to a glass mayonnaise bottle with the volume of 145 ml. 9.2 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 1.0 g of amino group-modified silicone as a simple substance with total amine value of 47 mgKOH/g, manufactured by Shin-Etsu Chemical Co., Ltd., trade name; "KP-356", and 5 g of triphenylphosphite as a curing accelerator were added thereto and stirred for 2 minutes at a temperature of 60° C., whereby 100 g of curing agent composition for epoxy resins F was obtained.

The curing agent composition for epoxy resins F thus obtained was mixed with DGEBA at a ratio shown in Table 3 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 3.

Comparative Example 5

83.6 g of polyamino compound A obtained by Example of Synthesis 1 was weighed and charged to a glass mayonnaise bottle with the volume of 145 ml. 9.3 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 0.4 g of acryl copolymer manufactured by Kyoeisha Chemical Co., Ltd., trade name; "POLYFLOW77", and 5 g of triphenylphosphite as a curing accelerator were added thereto and stirred for 2 minutes at a temperature of 60° C., whereby 100 g of curing agent composition for epoxy resins G was obtained.

The curing agent composition for epoxy resins G thus obtained was mixed with DGEBA at a ratio shown in Table 3 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 3.

Comparative Example 6

82.2 g of polyamino compound B obtained by Example of Synthesis 2 was weighed and charged to a glass mayonnaise bottle with the volume of 145 ml. 9.1 g of benzyl alcohol as a diluent, 1.7 g of polyether-modified polydimethylsiloxane as a simple substance with surface tension of 23.8 dyne/cm, manufactured by BYK-Chemie Japan KK, trade name; "BYK-345", 2.0 g of amino group-modified silicone 50% n-butanol solution (1.0 g as a simple substance) with total amine value of 509 mgKOH/g, manufactured by Shin-Etsu Chemical Co., Ltd., trade name; "KP-390", and 5 g of triphenylphosphite as a curing accelerator were added thereto and stirred for 2 minutes at a temperature of 60° C., whereby 100 g of curing agent composition for epoxy resins H was obtained.

The curing agent composition for epoxy resins H thus obtained was mixed with DGEBA at a ratio shown in Table 3 to obtain an epoxy resin composition. The epoxy resin composition thus obtained was cured under the conditions of 23° C. and 50% RH to prepare an epoxy resin cured coating film. The property of the epoxy resin cured coating film was evaluated and the result was shown in Table 3.

TABLE 1

|  | Example 1 | Example 2 |
| --- | --- | --- |
| Epoxy resin composition (g) | | |
| Epikote 828 | 100 | 100 |
| Curing Agent Composition A | 40 | |
| Curing Agent Composition B | | 40 |
| Property of a cured coating film | | |
| Appearance | | |
| Gloss | ◎ | ◎ |
| Clarity | ◎ | ◎ |
| Leveling | ◎ | ◎ |
| Dryness | | |
| (16 hours/1 day/4 days/7 days) | ○/◎/◎/◎ | ○/◎/◎/◎ |
| Water resistance | | |
| (16 hours/1 day/4 days/7 days) | ○/◎/◎/◎ | ○/◎/◎/◎ |
| Adhesiveness to a substrate | 25 | 25 |

TABLE 2

|  | Comparative Example 1 | Comparative Example 2 | Comparative Example 2 |
| --- | --- | --- | --- |
| Epoxy resin composition (g) | | | |
| Epikote 828 | 100 | 100 | 100 |
| Curing Agent Composition C | 40 | | |
| Curing Agent Composition D | | 40 | |
| Curing Agent Composition E | | | 40 |
| Property of a cured coating film | | | |
| Appearance | | | |
| Gloss | ○ | ○ | ◎ |
| Clarity | X | Δ | ◎ |
| Leveling | ○ | ○ | ◎ |
| Dryness | | | |
| (16 hours/1 day/4 days/7 days) | ○/○/○/○ | ◎/◎/◎/◎ | X/X/Δ/○ |
| Water resistance | | | |
| (16 hours/1 day/4 days/7 days) | Δ/Δ/Δ/Δ | X/X/○/◎ | X/X/X/X |
| Adhesiveness to a substrate | 25 | 25 | 25 |

TABLE 3

|  | Comparative Example 4 | Comparative Example 5 | Comparative Example 6 |
| --- | --- | --- | --- |
| Epoxy resin composition (g) | | | |
| Epikote 828 | 100 | 100 | 100 |
| Curing Agent Composition F | 39 | | |
| Curing Agent Composition G | | 39 | |
| Curing Agent Composition H | | | 38 |
| Property of a cured coating film | | | |
| Appearance | | | |
| Gloss | ○ | ◎ | ◎ |
| Clarity | X | ○ | ○ |
| Leveling | ◎ | ◎ | ○ |
| Dryness | | | |
| (16 hours/1 day/4 days/7 days) | ○/◎/◎/◎ | ○/◎/◎/◎ | ◎/◎/◎/◎ |
| Water resistance | | | |
| (16 hours/1 day/4 days/7 days) | ◎/◎/◎/◎ | ○/○/○/○ | Δ/Δ/Δ/Δ |
| Adhesiveness to a substrate | 10 | 0 | 0 |

What is claimed is:

1. A curing agent composition for epoxy resins comprising the following components (A), (B) and (C):
   (A) a polyamine compound which is a reaction product of a glycidyl compound selected from the group consisting of a bisphenol A-type epoxy resin and a bisphenol F-type epoxy resin with 1,3-bis (aminomethyl)cyclohexane, wherein said glycidyl compound and 1,3-bis (aminomethyl)cyclohexane satisfy the formula [D]/[G]=20–4, wherein [D] represents the number of active hydrogen atoms of 1,3-bis(aminomethyl)cyclohexane and [G] represents the number of epoxy groups of the glycidyl compound,
   (B) a polyether-modified polysiloxane having a surface tension in the range of 19.0 dyne/cm to 25.0 dyne/cm, and
   (C) an amino group-modified polysiloxane having a total amine value in the range of 150 mgKOH/g to 650 mgKOH/g,
   wherein the content of said component (B) is 0.1 to 2.0% by weight based upon the total amount of the components (A), (B) and (C), and the content of said component (C) is 0.5 to 3.0% by weight based upon the total amount of the components (A), (B) and (C).

2. The curing agent composition for epoxy resins according to claim 1, wherein said polyether-modified polysiloxane (B) has a surface tension in the range of 22.5 dyne/cm to 24.0 dyne/cm.

3. The curing agent composition for epoxy resins according to claim 2, wherein said amino group-modified polysiloxane (C) has a total amine value in the range of 300 mgKOH/g to 550 mgKOH/g.

4. The curing agent composition for epoxy resins according to claim 1, wherein said amino group-modified polysiloxane (C) has a total amine value in the range of 300 mgKOH/g to 550 mgKOH/g.

5. An epoxy resin composition comprising at least the following components (A), (B) and (C):
   (A) a polyamine compound which is a reaction product of a glycidyl compound selected from the group consisting of a bisphenol A-type epoxy resin and a bisphenol F-type epoxy resin with 1,3-bis (aminomethyl)cyclohexane, wherein said glycidyl compound and 1,3-bis (aminomethyl)cyclohexane satisfy the formula [D]/[G]=20–4, wherein [D] represents the number of active hydrogen atoms of 1,3-bis(aminomethyl)cyclohexane and [G] represents the number of epoxy groups of the glycidyl compound, (B) a polyether-modified polysiloxane having a surface tension in the range of 19.0 dyne/cm to 25.0 dyne/cm, and (C) an amino group-modified polysiloxane having a total amine value in the range of 150 mgKOH/g to 650 mgKOH/g, wherein the content of said component (B) is 0.1 to 2.0% by weight based upon the total amount of the components (A), (B) and (C), and the content of said component (C) is 0.5 to 3.0% by weight based upon the total amount of the components (A), (B) and (C).

6. The epoxy resin composition according to claim 5, wherein the content of said polyamine compound (A) is in the range of 0.7 to 1.2 in terms of a proportion of the number of active hydrogen atoms of said polyamine compound (A) to the number of epoxy groups of the epoxy resin.

7. The epoxy resin composition according to claim 6, wherein the content of said polyether-modified polysiloxane (B) is in the range of 0.005 to 1.5% by weight based upon the total amount of said epoxy resin composition.

8. The epoxy resin composition according to claim 6, wherein the content of said amino group-modified polysiloxane (C) is in the range of 0.01 to 1.5% by weight based upon the total amount of said epoxy resin composition.

9. An epoxy resin cured product obtained by curing the epoxy resin composition according to claim 6.

10. The epoxy resin composition according to claim 5, wherein the content of said polyether-modified polysiloxane (B) is in the range of 0.005 to 1.5% by weight based upon the total amount of said epoxy resin composition.

11. The epoxy resin composition according to claim 10, wherein the content of said amino group-modified polysiloxane (C) is in the range of 0.01 to 1.5% by weight based upon the total amount of said epoxy resin composition.

12. An epoxy resin cured product obtained by curing the epoxy resin composition according to claim 10.

13. The epoxy resin composition according to claim 5, wherein the content of said amino group-modified polysiloxane (C) is in the range of 0.01 to 1.5% by weight based upon the total amount of said epoxy resin composition.

14. An epoxy resin cured product obtained by curing the epoxy resin composition according to claim 13.

15. An epoxy resin cured product obtained by curing the epoxy resin composition according to claim 5.

* * * * *

UNITED STATES PATENT AND TRADEMARK OFFICE
CERTIFICATE OF CORRECTION

PATENT NO. : 8,431,653 B2
APPLICATION NO. : 11/637117
DATED : April 30, 2013
INVENTOR(S) : Shun Ogawa It is certified that error appears in the above-identified patent and that said Letters Patent is hereby corrected as shown below:

Title Page

Item (73) Assignee, please amend as follows:

"Mitsubishi Electric Company, Inc." should read --Mitsubishi Gas Chemical Company, Inc.--

Signed and Sealed this
Thirteenth Day of August, 2013

Teresa Stanek Rea
*Acting Director of the United States Patent and Trademark Office*